(12) United States Patent
Johnson

(10) Patent No.: US 7,870,295 B2
(45) Date of Patent: *Jan. 11, 2011

(54) PARSING MESSAGES WITH MULTIPLE DATA FORMATS

(75) Inventor: Michael Johnson, Awbridge (GB)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 12/109,123

(22) Filed: Apr. 24, 2008

(65) Prior Publication Data

US 2008/0187004 A1  Aug. 7, 2008

Related U.S. Application Data

(63) Continuation of application No. 11/757,127, filed on Jun. 1, 2007, which is a continuation of application No. 10/076,358, filed on Feb. 14, 2002, now Pat. No. 7,391,735.

(30) Foreign Application Priority Data

Mar. 29, 2001  (GB) ................... 0107882.3

(51) Int. Cl.
G06F 7/00 (2006.01)

(52) U.S. Cl. ..................................... 709/246

(58) Field of Classification Search ................. 370/473; 704/4, 9; 709/203, 206, 217, 246
See application file for complete search history.

(56) References Cited

U.S. PATENT DOCUMENTS

| | | | |
|---|---|---|---|
| 5,386,570 A | 1/1995 | Lindhorst | |
| 5,491,821 A * | 2/1996 | Kilis | 717/146 |
| 6,084,266 A * | 7/2000 | Jan | 257/341 |
| 6,101,556 A | 8/2000 | Piskiel et al. | |
| 6,134,598 A | 10/2000 | Raman | |
| 6,507,856 B1 | 1/2003 | Chen et al. | |
| 6,543,582 B2 | 4/2003 | DiFranza et al. | |
| 6,732,175 B1 | 5/2004 | Abjanic | |
| 6,785,682 B2 | 8/2004 | Todd | |
| 6,836,890 B1 | 12/2004 | Watts, Jr. et al. | |
| 6,886,166 B2 * | 4/2005 | Harrison et al. | 719/313 |
| 7,010,478 B2 | 3/2006 | Mathur et al. | |
| 7,032,219 B2 | 4/2006 | Mowers et al. | |
| 7,096,270 B2 | 8/2006 | Abjanic et al. | |
| 7,162,697 B2 * | 1/2007 | Markel | 715/717 |

* cited by examiner

Primary Examiner—Pankaj Kumar
Assistant Examiner—Duc T Duong
(74) Attorney, Agent, or Firm—Yee & Associates, P.C.; Jeffrey S. LaBaw

(57) ABSTRACT

Provided are a method for parsing a bit stream including multiple data formats, and an apparatus and computer program including a set of parsers and parser-selection and invocation capabilities for handling parsing of multiple data formats. A first parser is selected and invoked to handle a first formatted component of the bit stream, and this selected parser selects and invokes a next parser which is capable of handling a differently formatted next component of the bit stream. This is differentiated from systems which rely on a single generic parser or a single high-level parser selection process, and is especially advantageous when parsing messages to enable message processing in systems in which a message can include multiple different, nested data formats.

14 Claims, 3 Drawing Sheets

PARSING MESSAGES WITH MULTIPLE DATA FORMATS

This application is a continuation of application Ser. No. 11/757,127, filed Jun. 1, 2007, status pending which in turn is a continuation of application Ser. No. 10/076,358, filed Feb. 14, 2002, status allowed.

FIELD OF INVENTION

The present invention relates to parsing of data, such as in a messaging system in which messages may include a number of different data formats.

BACKGROUND

Parsing of data typically involves an initial lexical analysis step which involves breaking up the input data into logically separate components, such as field names, constants, operators (the lexical analyser outputs a string of 'tokens') and then a syntactic analysis step which involves processing the tokens to determine the syntactic structure of the data as defined by a grammar. A lexical analyser may also remove redundant spaces and may deal with character-set mappings (e.g. replacing upper case letters with lower case). The term parser is used to refer to a program which performs such analysis. The output of a syntax analyser may be a syntax tree (also known as a parse tree) which represents the syntactic structure of the string of data being parsed. Parsing is well known in the context of compilers, but is a required step for many data processing operations. For example, a message processing program may need to parse an input message to model the message structure before it can begin processing the message—for example to understand the structure and format of the message before performing format conversion. This may include separating a message descriptor into a set of fields comprising name-value pairs so that the different values in the named fields can be processed, and similarly separating a stream of bits comprising the message data into name-value pairs so that the data can be processed.

It is now very common for a computing network to integrate many heterogeneous systems, and individual messages sent across these networks may include different data formats within headers inserted by the different systems through which the message passes. It is therefore important for a network-wide messaging service to be capable of handling a number of different data formats within a single message, to support the increasing requirement for business and system integration. It is a feature of some existing messaging products to be able to parse an incoming message which includes a number of different format components, splitting the message into its differently formatted constituent parts and separately parsing these parts to generate an output message for further processing.

In the past, these messaging products have relied on predefined message formats and either a generic parser or a single parser-selection process which has access to a repository of message formats. Either the generic parser analyses all components itself or a process scans through the message to identify the differently formatted components, comparing the identified formats with those in the repository, and then a selector assigns each component to a specific parser which is capable of performing syntactic analysis for that component.

This approach has proven satisfactory for situations in which only a small number of formats are possible and the format and sequence of all the message components is known in advance, since this knowledge enables the selection of appropriate parsers for the different components. It may also be possible in some cases, IC although inefficient, to rely on a generic parser to perform an initial analysis and resulting parser-selection before the main syntactic analysis begins. However, this would require the generic parser to be capable of analysing all data formats within each message so that the first scan of the message could break the message into components and could provide the information to determine which specific parser should handle which components. It may be very difficult to implement such capability within a single generic parser. Secondly, separating syntactic analysis into separate first and second steps would entail processing delays and would tend to duplicate some of the analysis.

An alternative to this initial step of a generic parser analysing the whole message is for individual selected parsers to perform syntactic analysis of specific parts of a message, including identifying the data format or data type of the next message component in the sequence of bytes which makes up the message. In this case, a parser-selection process can identify the format of a first component and select a first specific parser; the selected parser can then parse this first component, identify the format or type of the next component and send this format or type information to the parser-selector to invoke another specific parser for this next message component. As noted above, such solutions rely on knowledge of predefined message formats and predictable sequences of message components. This has proven satisfactory for handling differently formatted message headers, if the selected parsers are given the knowledge of which field to read to determine the format of the next message component, and if the data within the body of the message has a single format such that a single parser can parse the entire contents of the message body. The class name of the required parser can be included in a format field of a message descriptor or another header of the message, and this can be read to select and then invoke the appropriate parser.

A problem arises with the above solution when a message body includes multiple nested data formats, since then the reliance on the single parser-selector to call the appropriate program at the required time involves an excessive number of communication flows between the specific selected parsers and the parser-selector. It also requires the parser-selector to be able to invoke a suitable specific parser for all formats and for unpredictable nested structures, such that the selector needs a detailed knowledge of an ever increasing number of formats. The problems of this approach will become clear in future as the number of message data formats and the complexity of message contents increases with increasing systems and business integration.

Thus, there remains a requirement for an efficient solution to parsing of messages which include multiple data formats, especially when the different formats can be nested within one another and the structure of the message is not known in advance of its receipt and analysis by a messaging program. The problems of known solutions are especially acute for messages in which either individual components or the sequence of components do not have a predictable structure, since then a message analysis is required as part of the runtime operation of the messaging program before it is possible to select a parser to analyse a next component of the message.

SUMMARY OF INVENTION

In a first aspect, the present invention provides a data processing apparatus for processing messages which may contain a plurality of data formats, the apparatus including a set of selectable parsers, each adapted for analysing a specific set of one or more data formats, wherein a plurality of said set of parsers each include: means for parsing a first component of a message, means for identifying the data format of a second component of the message, and means, responsive to said identification, for selecting another one of said set of parsers and for invoking the selected parser to parse the second message component.

This preferably includes the capability of a first selected parser, to which a portion of a message has been allocated for parsing, to identify subcomponents within this message portion which should be allocated to a different parser and to select and invoke a parser using subcomponent format information within the message. The first selected parser preferably passes only a specific subcomponent to the different parser and keeps control for analysing format information for other subcomponents to select and invoke an appropriate parser for those subcomponents.

This invention changes the distribution of responsibilities compared with existing parsing solutions, producing an hierarchical tree of parsers to handle nested-format messages instead of the horizontal chain of parsers controlled by a single selector process (which is the result of known solutions). The depth of the hierarchy can be determined in response to the structure of a received message rather than being hard coded into the parser program. The invention mitigates the inefficiencies of solutions which rely on a single generic parser to handle all of the analysis of message components or to perform a partial analysis to determine which specific parsers to use. It also mitigates the inefficiencies of solutions in which a plurality of parsers are always required to call a generic parser-selector to invoke another specific parser.

Since an analysis step performed by a generic parser cannot be optimised for all data formats, messaging systems which rely on generic parsers will be unable to efficiently handle multiple-format messages in a heterogeneous network. As systems integration requirements and the number of different message formats increase, the inadequacies of such systems will become clear. Similarly, reliance on a single parser-selector process will prove inadequate as the number of message data formats and the possibility of nested-formats and unpredictable structures within the body of a message increases.

Hence there are significant benefits in the solution of the present invention which enables specific parsers to perform the selection and instantiation of a next parser without having to make a call to a generic parser or parser-selector to perform this instantiation. The invention enables a reduction in the cost and potential delays of inter-process communication flows and avoids having to continually update the generic parser or parser-selector to provide capabilities to cope with new formats and structures. Nevertheless, the solution of the present invention is in contrast to the current technological trend of relying on a single generic parser or a single specialised parser selection process. The invention requires a recognition that the limitations of current systems will result in significant problems when parsing complex nested-format messages, and a recognition that changing the structure of and distribution of responsibilities within a parsing mechanism by adding parser-selection and parser-invocation capabilities to specific selectable parsers will provide significant benefits which outweigh the costs.

A specific example of the problems of known prior art solutions arises when a message to be parsed contains a component in SAP AG's IDoc format (IDoc is the short-form name of the 'Intermediate Documents' exchanged within SAP's R/3 system, and the name is also used to describe the data format of these documents. SAP and R/3 are trademarks of SAP AG). An IDoc component contains a control structure component (DC) and a variable number of data components (DD) and it is only possible to determine the number of DDs during parsing. There may also be multiple IDocs within a single message stream. A typical generic parser would not be capable of separating an IDoc into its constituent parts and analysing those parts. Similarly, it would be inefficient to rely on a single generic parser-selection process to assign the DC and DDs to different parsers. A preferred embodiment of the present invention allows a specific IDOC parser to be selected in response to a parser of a message descriptor or header identifying that the next component has the IDoc format. The IDOC parser can then analyse the DC component and select and instantiate a further parser for handling each of the DD components. After each DD component is handed to a newly instantiated parser, the IDOC parser retains responsibility for identifying the next component (whether a PD or another DC) and selecting the appropriate parser. This ability to instantiate a parser to handle a subcomponent of an allocated portion of a message is a significant difference from control always being returned to a single parser-selector for each component.

As well as enabling incoming IDoc data to be represented to a message processing program in a format that the program can understand and manipulate, the IDOC parser according to a preferred embodiment of the present invention also supports creation of output messages in the SAP IDoc format. This two-way format conversion capability supports integration between SAP systems and a message processing program which includes the IDOC parser.

To implement IDoc parsing capability within a single generic parser-selector, and to add similarly specific functionality to the single selector for other data formats such as SWIFT messages, would result in excessive program complexity and require repeated re-coding of the selector to support new message types. The SWIFT message format, defined by the Society for Worldwide Interbank Financial Telecommunication, is another example of a message format where the sequence of components is not fully known in advance.

As the requirements for systems and business integration extend to cover additional systems, and as new data formats are created, the present invention provides an extensible solution to which new parsers can be added which have integrated parser-selection capabilities. This is easier to update and maintain than known solutions in which the new capabilities have to be added to a generic parser or a single parser-selector.

In a second aspect, the invention provides a method of parsing a message containing a plurality of data formats, the method comprising: identifying the data format of a first component of the message; responsive to said identification, selecting and invoking a first parser to parse the first component; and using said first parser to identify the data format of a second component of the message and, responsive to said identification, using said first parser to select and invoke a second parser for parsing the second message component.

In a preferred method, the second message component can be a subcomponent of the first component, and the first selected parser is able to assign a specific chunk of a message bit stream (corresponding to this second subcomponent) to the second parser while retaining control for selecting and invoking a parser for subsequent message components. In the example of IDoc message components mentioned above, the IDOC parser assigns a DD to a specific parser while retaining responsibility for identifying a next message component (whether a DC or a specific format DD) and for selecting and invoking a next parser (for a DD) or parsing the next component itself (in the case of a DC).

In a third aspect, the invention provides a message processing system including a parser selector and a set of selectable parsers, each selectable parser being adapted for analysing a respective set of message data formats, wherein said set of selectable parsers are each selectable in response to identifying a message data format within the respective set, and wherein at least one of said selectable parsers includes: means for parsing a first component of a message having a message data format within the respective set; means for identifying the data format of a second component of the message; and means, responsive to said identification, for selecting another one of said set of parsers and for invoking the selected parser to parse the second message component.

The above-described selectable parser preferably comprises an IDOC parser for parsing message data in the IDoc format, including means for parsing a DC component of an IDoc, means for identifying a DD component, and means for selecting and invoking another parser for parsing the identified DD component.

In a fourth aspect, the invention provides a computer program for controlling the operation of a data processing apparatus on which it runs to perform a method as described above. The computer program may be made available as a program product comprising program code recorded on a computer readable recording medium.

BRIEF DESCRIPTION OF DRAWINGS

Preferred embodiments of the invention will now be described in more detail, by way of example, with reference to the accompanying drawings in which.

DETAILED DESCRIPTION OF PREFERRED EMBODIMENTS

Figure 1:
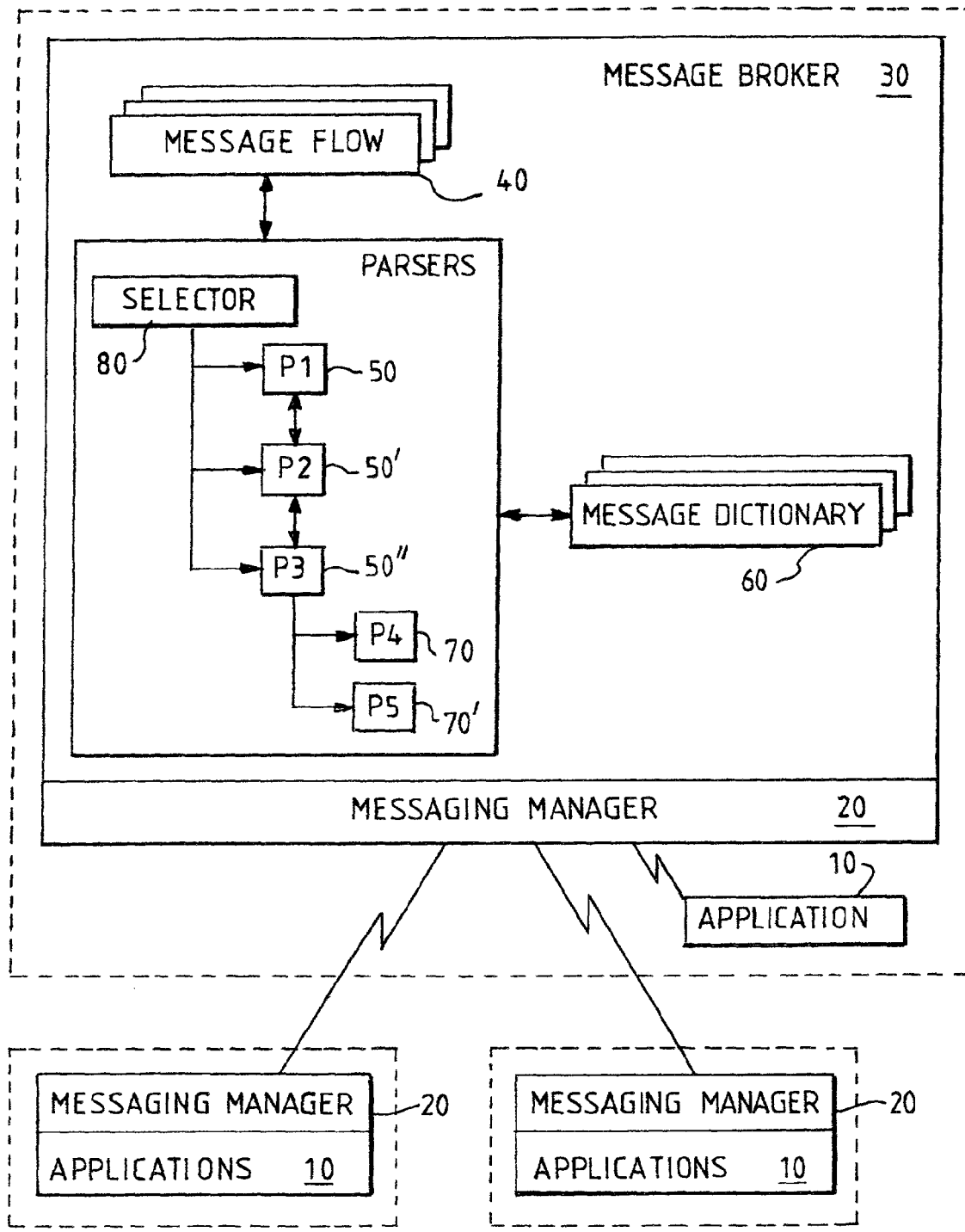
FIG. 1 shows a message broker within a messaging network, including a parsing solution according to an embodiment of the present invention.

FIG. 1 is a schematic representation of a messaging network in which a number of application programs 10 are communicating via messaging manager programs 20 which provide message delivery services and via a message broker 30 which implements a set of rules to provide message routing and message transformation (and message creation in response to certain received messages). The message broker 30 and messaging manager programs 30 enable diverse applications to exchange information in unlike forms—the brokers handling the processing required for the information to arrive in the desired place in the correct format and the messaging manager programs handling the complexities of network communications to provide assured delivery of messages across the network between different computer systems. Such messaging services are provided by the commercially available MQSeries family of products from International Business Machines Corporation (MQSeries is a trademark of IBM Corporation).

IBM's MQSeries Integrator products support business and application integration, using message brokers 30 to manage the flow of information between applications. The brokers are a resource which hosts and controls message flows 40 which implement business processes. Applications send messages to a message flow, which is a sequence of message processing nodes that each implement rules (a set of processing actions), to process the messages and generate one or more outputs for sending to target applications using MQSeries messaging and queuing communications. IBM's MQSeries Integrator products include a Control Centre which provides a user interface for creating message flows by selecting and connecting message processing nodes. IBM's MQSeries Integrator products are described in more detail, for example, in MQSeries Integrator v2.0.1 Introduction and Planning, IBM Document GC34-5599-01.

Among many other capabilities, the brokers provide the capabilities to.

Route a message to several destinations using rules that act on the contents of one or more fields in a message or message header; and Transform a message so that applications using different formats can exchange messages in their own formats. The broker knows the requirements of each application (for example, whether personal names should have the surname first or last, with or without middle initials, upper or lower case) and so it can transform the message to the correct format (changing the order of fields, the byte order, the language, and so on).

Within a message flow 40, the action to be taken can be defined according to the message structure, the message topic, or the data within the message. Alternatively, the originator of the message or its destination may be significant. Any combination of one or more of these attributes can define the rules by which messages are processed. A message flow can process one message in several ways to deliver a number of output messages, perhaps with different format and content, to a number of target applications.

Each message flowing through a message broker has a specific structure, which is important and meaningful to the applications that send or receive that message. Message structure information as used in IBM's MQSeries Integrator products comprises a message domain, message set, message type, and wire format of the message. Together these values identify the structure and format of the data the message contains. Every message flow that processes a message conforming to this structure and format must understand it to enable the message bit stream to be interpreted.

The message structures which can be handled by the message brokers comprise those which are predefined within one or more message repositories 60 as well as self-defining message structures (such as message data in XML which is a string of name-value pairs such the parser can simply locate a specified name in a message and extract the data value). The message repositories hold information for a number of message formats defining the arrangement of named data fields in messages of the respective format. Then a format name lookup step can extract the message format template which can be applied to any message having that format to generate a view of the message as a sequence of name-value pairs which can be interpreted and manipulated.

When a message is to be processed by a message flow, it is first necessary to decode the message bit stream using one or more message parsers 50 to enable the various components of the message to be understood. Message type and format information for messages predefined in the message repositories is typically included in the messages' headers, and so a parser can recognise the message structure and format when the message is received. Messaging products such as IBM's MQSeries Integrator product are known to include a number of message parsers 50 which can parse known message structures including specific headers. However, with increasing systems and network integration, it is a requirement for these solutions to be extensible to add new parsers for new message structures and new data formats within a message. A particular extensible solution which is implementable within computer program products such as IBM's MQSeries Integrator products, and which satisfies this message broker parsing requirement will now be described in detail.

Figure 2A:
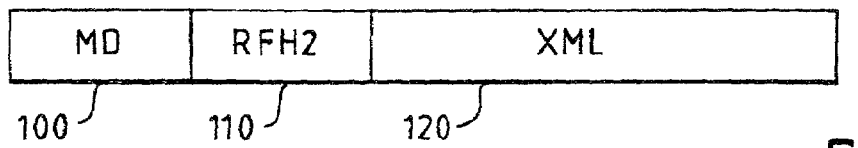
FIG. 2 shows a simple example message structure.

FIG. 2A shows an example message structure of a message as taken from an input message queue. This comprises a message descriptor 100 (MD), one or more additional message headers 110 (in this case RFH2), and a message body 120. Normally the message data within the body part of the message has a single format, and so a single parser will handle the parsing of the entire data contents. Nevertheless, as the bit stream of the message is analysed to identify the separate MD, headers and body components, each of these components will be assigned to an appropriate parser. Additionally, the message as modelled by parsing will include a Properties component which is generated from data provided by the input node of the message flow (see next paragraph—this is possible if only messages having certain properties are input to this input node) and/or from data extracted from the message headers. The Properties component will be handled by an appropriate parser which is typically different from the parsers handling the MD, headers, and body. If the message body contains multiple nested formats, then multiple parsers will also be required to parse the body. The implementation of parser selection and invocation for handling nested message formats will be described below.

Figure 3:
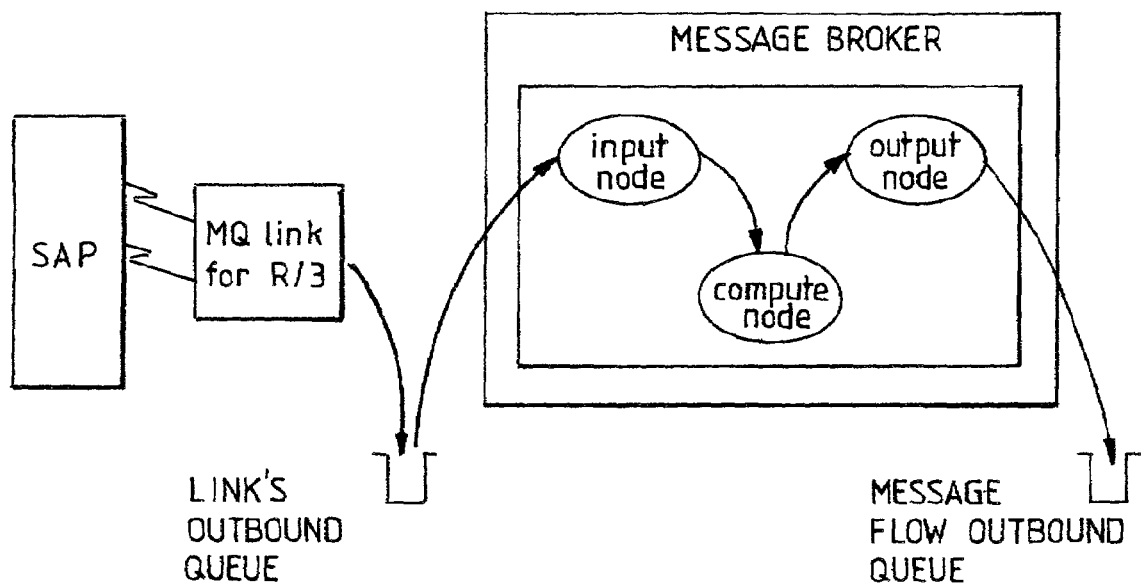
FIG. 3 is a schematic representation of message flows between a SAP R/3 system and a message broker such is as IBM's MQSeries Integrator broker.

Within a simple example message flow of a message broker comprising an input node, a processing node and an output node, the processing node may be a Compute node which transforms a message from one format to another, so that sending and receiving applications can communicate with each other using their own formats. Such a simple message flow is shown in FIG. 3. The input node requires the message to be parsed to understand its structure before the Compute node can perform its format transformation.

On receipt of a message, the message broker 30 must pass the message bit stream (an array of bytes which make up the message) to a message parser 50. Consider the previous example of an incoming message which comprises:

A message descriptor (MD)
An RFH2 header
An XML data portion

A parser selector 80 of the broker 30 sends the MD component to an MD parser 50, which accesses a structure template for MDs which is stored in the message repository 60 and applies this to the received MD to model it as a sequence of ordered name-value pairs. The MD parser then reads one or more predefined message fields identifying the next message component's type and/or its format, compares this information with a list of component types/formats and selects and invokes another parser 50 which has a predefined responsibility for handling parsing of components having this type and/or format. The MD parser also specifies what portion of the bit stream it has consumed to indicate where a next selected parser 50 should begin. If the next component is the RFH2 header, then this component is given to a specific RFH2 parser. The RFH2 parser applies a stored RFH2 template to parse the header, modelling it as a sequence of name-value pairs, and then this RFH2 parser reads one or more fields relating to the next component. If the next component is the XML data portion, then the RFH2 parser invokes an XML parser in response to identifying that the component comprises XML. Since the templates stored for the MD and message headers determine what is the last field within their respective message component, the MD and RFH2 parsers can easily determine when to invoke the next parser.

Once the relevant parsers within the set of available parsers have been invoked to handle their respective chunks of the message bit stream and to create a syntax element tree, this syntax element tree can then be manipulated by the message broker's processing nodes. For example, the formatting 'Compute' node constructs an output message the elements of which can be defined using an SQL expression and are based on elements of the input message. Other processing nodes' output message elements may be based on elements of the input message and data extracted from an external database.

The above description shows the sequence of operations of an embodiment of the present invention in which a selected parser selects and invokes a next parser for handling the next component of the message, but the above description relates to an example with a single format message body. Many received messages will not be this simple.

Figure 2B:
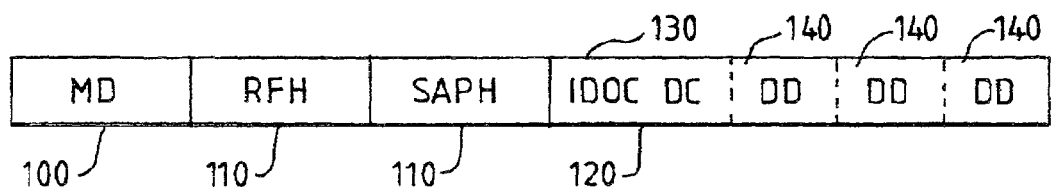

Referring to FIG. 2B, if a message's body component 120 comprises an IDoc, then the MD 100 or another message header 110 will include an identification of this component type (for example showing 'IDOC' in the format field of the MD). This information is used during parsing of the message to invoke a dedicated IDOC parser 50 and to indicate which format dictionary 60 is to be used. Thus far, there is no conceptual difference from the XML body example in which selected parsers can select and invoke further parsers. However, markup languages such as XML are self-defining and so a single XML parser can be used. An IDoc, which is not self-defining in the markup sense, also does not have a predicable number of data components. In particular, a control structure DC component 130 may be followed by one or many data segment DD components 140. The last one of this sequence of DDs may be the end of the message, or it may be followed by another DC and one or more DDs, or there may be additional non-IDoc message components. Therefore, an analysis of the IDoc structure is necessary to determine which parser to use for which sub-component. In this case, it is desirable for the IDOC parser to control the selection and instantiation of particular parsers to handle subcomponents of the bit stream for which it is responsible—the IDOC parser building an hierarchical tree of parsers.

In brief, the Version 4 IDoc structure comprises fixed size structures, the first of which is the DC control structure which is 524 bytes long. The one or more subsequent segment data DD's are each 1063 bytes long. Each DD structure is composed of name-value pairs plus a 1000 byte final field which holds the segment data. An IDoc can hold many different message types and each message type can have many different segments.

The IDOC parser is invoked in response to identification of the IDOC type information in a message descriptor or message header field. Firstly, the IDOC parser parses the DC component, applying its knowledge of IDoc structures (a DC template) to generate a sequence of name-value pairs. Next, the IDOC parser investigates the first field of the DD which follows the DC. This provides an identification of a specific message format within the dictionary of message formats which is associated with the IDOC parser. This message format identifier and dictionary name is then passed to a Message Repository Manager which both implements the respective parser and holds the format templates which are required by the parser programs. This Message Repository Manager comprises a collection of parsers and a dictionary of formats in which individual format names are associated with predefined format templates. The Message Repository Manager is thus instantiated to run the relevant parser for the 1063 bytes of the current DD, to model this data for subsequent processing. The IDOC parser then investigates the first field of the next component of the message, which may be a DC or DD, and then instantiates the required parser to handle this next component. If it is a requirement for the message broker to be able to handle messages which include additional data subsequent to the last DD of the IDoc, then the IDOC parser will also be required to investigate the format of the next component to invoke an additional parser.

Thus, the IDOC parser takes input messages in valid IDoc format and creates logical message tree structures which can be interpreted by the broker's message flows. Similarly, this IDOC parser can take a logical message tree created by a message flow and produce the data portion of a message broker's message in IDoc format. That is, once a Compute node, for example, has finished manipulating the syntax element tree which represents the message, the IDOC parser will be called once again to rebuild the bit stream at the output node of the message broker's message flow.

In a particular implementation of the invention for parsing logical message trees within a message broker, all such trees have a basic structure which has a single high-level element known as the root element. The user data found in the body of the message has a high-level element which is one of the child elements (typically the last child element) of the root element as well as additional elements at a lower level of the hierarchy which correspond to the sub-components of the IDoc. For a SAP IDoc message, the name of the high level element is 'IDOC' to match the message domain supported by the parser, since the IDOC parser registers with the broker for a message domain of 'IDOC'. The IDOC parser then attempts to parse any input message that is read by the message broker and has this message domain specified either in the RFH2 header or another message header or in the input node of the particular message broker's message flow. The parser will thus create a logical message tree that reflects the contents of the message, with the top-level element of the body having the name 'IDOC' and the rest of the data for this IDoc structure built as a logical data structure unde this high-level element.

Figure 4:
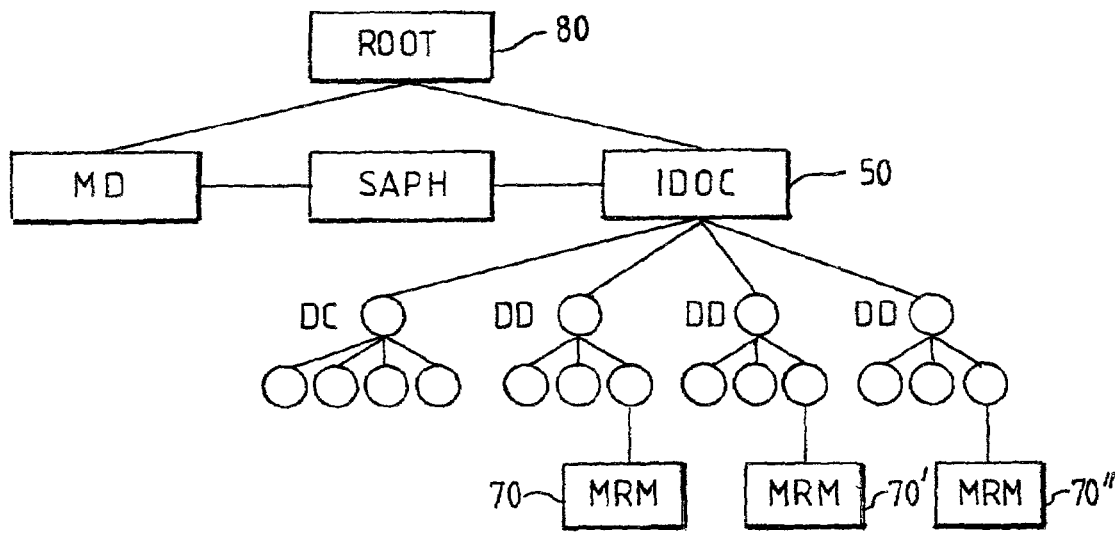
FIG. 4 is a representation of the hierarchical parser's view of a message which includes an IDoc.

FIG. 3 provides a schematic representation of a SAP R/3 system communicating with a message broker such as IBM's MQSeries Integrator product via a communication link and a link program component (such as the MQSeries link for SAP R/3 program) which handles placing of a message received from the SAP system onto a queue under transactional control (i.e. Using a transaction ID for a received message to ensure one full copy only of each message is placed on the queue). The input node of the message broker's message flow has been configured to read from this queue. The default message domain of the input node is set to 'IDOC'. A syntax element tree is generated by the parsing processes as described above. An message including an IDoc sent from a SAP R/3 system via the link program component and then parsed as described above would be represented by the parsing processes including the hierarchical IDOC parser as shown in FIG. 4. All is messages from the link program component connecting the SAP R/3 system to the message broker include an additional header not described above. This SAPH header is assigned to its own parser. As stated previously, any number of additional message headers and nested formats can be handled as described above. The link program component also ensures that atomic transactional principles are followed when sending messages from the message broker to the SAP system, rolling back a message onto the broker's output queue to enable a retry if it is not possible to deliver it on a first attempt.

A list of field names of DC and DD structures which are understood by the IDoc parser of a first implementation of the present invention are shown below. These are documented in the form in which they would be used in a SET statement of eSQL. For example:

```
SET OutputRoot.Properties = InputRoot.Properties;
SET OutputRoot.MQMD = InputRoot.MQMD.
```

Control Section (DC) Fields

All fields must be specified and set

```
The syntax is <rootname>.<Parser Name>.<folder name>.<field name> =
SET "OutputRoot"."IDOC"."DC"."tabnam" =
SET "OutputRoot"."IDOC"."DC"."mandt" =
SET "OutputRoot"."IDOC"."DC"."docnum" = '0000000000000001';
SET "OutputRoot"."IDOC"."DC"."docrel" = '45B';
SET "OutputRoot"."IDOC"."DC"."status" = '30';
SET "OutputRoot"."IDOC"."DC"."direct" = '1';
SET "OutputRoot"."IDOC"."DC"."outmod" = '4';
SET "OutputRoot"."IDOC"."DC"."exprss" = '';
SET "OutputRoot"."IDOC"."DC"."test" = '';
SET "OutputRoot"."IDOC"."DC"."idoctyp" = 'MATMAS01';
SET "OutputRoot"."IDOC"."DC"."cimtyp" = '';
SET "OutputRoot"."IDOC"."DC"."mestyp" = '';
SET "OutputRoot"."IDOC"."DC"."mescod" = '';
SET "OutputRoot"."IDOC"."DC"."mesfct" = '';
SET "OutputRoot"."IDOC"."DC"."std" = '';
SET "OutputRoot"."IDOC"."DC"."stdvrs" = '';
SET "OutputRoot"."IDOC"."DC"."stdmes" = '';
SET "OutputRoot"."IDOC"."DC"."sndpor" = '';
SET "OutputRoot"."IDOC"."DC"."sndprt" = '';
SET "OutputRoot"."IDOC"."DC"."sndpfc" = '';
SET "OutputRoot"."IDOC"."DC"."sndprn" = '';
SET "OutputRoot"."IDOC"."DC"."sndsad" = '';
SET "OutputRoot"."IDOC"."DC"."sndlad" = '';
SET "OutputRoot"."IDOC"."DC"."rcvpor" = '';
SET "OutputRoot"."IDOC"."DC"."rcvprt" = '';
SET "OutputRoot"."IDOC"."DC"."rcvpfc" = '';
SET "OutputRoot"."IDOC"."DC"."rcvprn" = '';
SET "OutputRoot"."IDOC"."DC"."rcvsad" = '';
SET "OutputRoot"."IDOC"."DC"."rcvlad" = '';
SET "OutputRoot"."IDOC"."DC"."credat" = '';
SET "OutputRoot"."IDOC"."DC"."cretim" = '';
SET "OutputRoot"."IDOC"."DC"."refint" = '';
SET "OutputRoot"."IDOC"."DC"."refgrp" = '';
SET "OutputRoot"."IDOC"."DC"."refmes" = '';
SET "OutputRoot"."IDOC"."DC"."arckey" = '';
SET "OutputRoot"."IDOC"."DC"."serial" = '';
```

Data Section (DD) Fields

To access each DD segment use the array suffix ie. DD [1], DD[2] etc.

Note the use of the '2' sufix to give unique field names on the mandt and docnum fields

```
SET OutputRoot.IDOC.DD[I].segnam = 'E2MAKTM001';
SET OutputRoot.IDOC.DD[I].mandt2 = '111';
SET OutputRoot.IDOC.DD[I].docnum2 = '9999999999999111';
SET OutputRoot.IDOC.DD[I].segnum = '111000';
SET OutputRoot.IDOC.DD[I].psgnum = '000111';
SET OutputRoot.IDOC.DD[I].hlevel = '11';
```

Segment Fields

Use the 'sdatatag' keyword to indicate to the parser that it is the element that contains the segment data which is to be manipulated. The MRM indicates that the MRM will handle the transformation. The final field identifies the actual field of the segment. The final line is the filler for the segment as an incoming IDoc to SAP must have each segment 1000 bytes long.

```
SET OutputRoot.IDOC.DD[I].sdatatag.MRM.msgfn = '006';
SET OutputRoot.IDOC.DD[I].sdatatag.MRM.spras = 'E';
SET OutputRoot.IDOC.DD[I].sdatatag.MRM.maktx = 'Buzzing
  all night';
SET OutputRoot.IDOC.DD[I].sdatatag.MRM.msgfn = '006';
SET OutputRoot.IDOC.DD[I].sdatatag.MRM.spras_iso = 'EN';
SET OutputRoot.IDOC.DD[I].sdatatag.MRM.fill954 = ' ';
```

Note that the traditional way of parsing a bit stream is to traverse the incoming bit stream from left to right, paring the respective sections of the bit stream to the appropriate parser until all the bit stream is parsed. This in effect is a horizontal pass of the data. According to the embodiment of the present invention described above, an hierarchical tree of parsers may be created since one or more of the selected parsers is able to call other parsers to process subcomponents of the portion of the message bit stream it is handling, or to call a parser to handle the next component of the message subsequent to that portion. Thus, an incoming bit stream is passed to an appropriate parser and this parser then passes sections of this bit stream to other parsers before returning back to the original bit stream to have the remains of the unclaimed bit stream passed to the next appropriate parser. This hierarchical parsing approach allows a message broker to model data which is not known until runtime, without excessive communication flows to and from a single selector process and without the overhead of having to update a generic parser or generic selector each time a new data format is added. This approach enables a dedicated parser to be given detailed knowledge of the structures and formats of a particular type of message for which it will be responsible. Implementing this level of detailed knowledge of many different message types in a single parser or parser-selector would be a very inefficient.

While an embodiment of the present invention has been described above using the example of IDocs, aspects of the invention are equally applicable to other message data formats such as messages which include data in the SWIFT message format where the sequence of components is not fixed or other message structures and formats which are not fully predefined.

The invention is also applicable to data processing environments other than message brokers in an heterogeneous network, although the invention is especially advantageous for that environment. Thus, one aspect of the present invention provides a parsing program comprising a set of selectable parsers which are each adapted for parsing a specific set of one or more data formats, wherein a plurality of the set of parsers have the following capabilities:

Parsing a first component of a bit stream;

Identifying the data format of a second component of the bit stream, which may be a subcomponent of the first component;

In response to the format identification, selecting and invoking another one of the set of parsers to parse the second component.

This enables a selected parser of a set to control selection of other parsers to handle either subcomponents of the portion of a bit stream for which it has been given responsibility, or to invoke a next parser for a component of the bit stream subsequent to its assigned portion of the bit stream, both of which capabilities provide increased efficiency when parsing a bit stream which includes multiple nested data formats.

Figure 5:
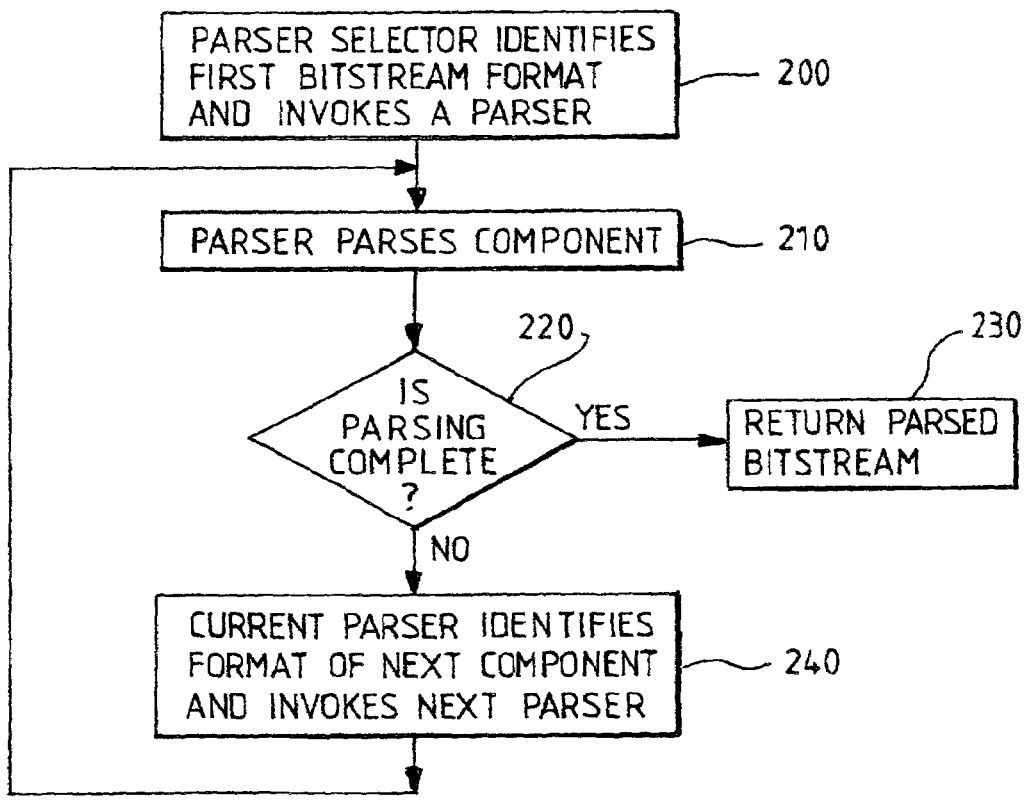
FIG. 5 is a representation of a sequence of steps according to an embodiment of the invention.

The steps of a method according to an embodiment of the invention for parsing a data stream including multiple nested data formats can be summarised with reference to FIG. 5. This shows an initial step of a selector program component 80 identifying 200 the format of a first data component of the bit stream. The bit stream may include a field containing the class name of a specific parser for handling this data format or it may include data format information that can be compared with a repository holding information regarding which parsers are registered to handle which formats. The information in the repository may be parser class names. The selector then instantiates 200 the named parser class to generate a specific instance of the appropriate parser to handle the current format. In alternative embodiments, the format of the first portion of all bit streams may be predefined for the particular system so that the appropriate first parser can be invoked without format analysis. The selected parser begins parsing 210 the first component of the bit stream.

Two possible situations can now arise. If the bit stream has a single format, the selected parser parses the whole bit stream to output a model 230 of the data for subsequent processing. If the bit stream includes multiple formats, the first selected parser is responsible for identifying 240 the format of the component of the bit stream which follows the component it has parsed. This involves the parser analysing the contents of specific fields of the bit stream in a similar manner to the initial analysis performed by the selector component 80. The current parser then calls a create parser method 240 for the appropriate parser class to invoke a parser to handle this next component of the bit stream. This parser parses its component 210, and the selection and parsing steps are repeated for subsequent components having different formats. Each parser reports what portion of the bit stream its parsing has handled so that the information is available to determine where the next selected parser should begin.

While this method is advantageous for a bit stream comprising distinctly separable components, it is especially advantageous to enable selected parsers to invoke a next parser when one component includes a differently formatted subcomponent such that a parser handling the component only requires a different parser to handle its subcomponent and then requires control to be returned to it. In this case, a selected parser is handed a chunk of the bit stream having a known size, it parses this chunk and returns control to the parser which selected it. This provides significant advantages compared with known alternatives when it is necessary to parse a component in order to determine the format of (and hence select a suitable parser for) its subcomponents.

What is claimed is:

1. A message processing system including:
   a set of selectable parsers, each selectable parser being adapted for analyzing a respective set of message data formats and being selectable in response to identifying a message data format within the respective set;
   a process for invoking, by a data processing apparatus in the message processing system, a parser from the set, wherein at least one of said selectable parsers:
   parses a first component of a message having a message data format within the respective set;
   identifies the data format of a second component of the message;

responsive to said identification, selects another one of said set of parsers and for invoking the selected parser to parse the second message component; and includes a repository of message format templates, each template representing the field structure of a particular format of message component, wherein said at least one parser is adapted to parse the first component and then to read a format field of a second component of the message to identify the data format of the second component, and wherein invoking the selected parser to parse the second component includes providing to the selected parser an identification of the message format template corresponding to the identified format.

2. A message processing system according to claim 1, wherein said at least one parser parses the first component to enable identification of a format field containing information relating to the format of the second component.

3. A parser program stored on a non-transitory computer readable medium comprising program code for execution on a computer for processing a bit stream which may contain a plurality of data formats, the parser program including a set of selectable parsers, each adapted for analyzing a specific set of one or more data formats, wherein the parser program includes:

instructions for selecting, by a parser selector, a first parser to parse a first component of a bit stream;

instructions for parsing, by the first parser, the first component of the bit stream;

instructions for identifying, by the first parser, the data format of a second component of the bit stream; and instructions for selecting, by the first parser, a second parser in the set of parsers based on the data format of the second component and for invoking the second parser to parse the second component, wherein said instructions for invoking the second parser includes instructions for inputting the second component to the second parser.

4. The parser program according to claim 3, wherein the second parser is adapted to access a format template from a format dictionary corresponding to the format identified by the first parser.

5. The parser program according to claim 3, wherein the instructions for parsing the first component are adapted to output a name-value pair indicating the format of the second component.

6. The parser program according to claim 3, wherein the instructions for identifying the data format of the second component comprises instructions for analyzing a format field of the second component.

7. The parser program according to claim 3, wherein the second parser returns control to the first parser after parsing the second component.

8. The parser program according to claim 3, further comprising:

instructions for identifying, by the second parser, a data format of a third component of the bit stream; and instructions for selecting, by the second parser, a third parser in the set of parsers based on the identified data format of the third component and for invoking the third parser to parse the third component.

9. A computer implemented method of parsing a message containing a plurality of data formats, the computer implemented method comprising:

responsive to identifying a data format of a first component of the message, selecting and invoking, by a data processing apparatus, a first parser to parse the first component;

identifying the data format of a second component of the message using the first parser; and responsive to said identification, using the first selected parser to select and invoke, based on the data format of the second component, a second parser for parsing the second message component, wherein invoking the second parser includes inputting the second component to the second parser; and parsing the second component using the second parser.

10. The computer implemented method according to claim 9, wherein the second parser is adapted to access a format template from a format dictionary corresponding to the format identified by the first parser.

11. The computer implemented method according to claim 9, wherein parsing the first component outputs a name-value pair indicating the format of the second component.

12. The computer implemented method according to claim 9, wherein identifying the data format of the second component comprises analyzing a format field of the second component.

13. The computer implemented method according to claim 9, wherein the second parser returns control to the first parser after parsing the second component.

14. The computer implemented method according to claim 9, further comprising:

identifying, by the second parser, a data format of a third component of the bit stream; and selecting, by the second parser, a third parser in the set of parsers based on the identified data format of the third component and for invoking the third parser to parse the third component.

* * * * *